United States Patent
Rhoads et al.

(10) Patent No.: US 10,491,086 B2
(45) Date of Patent: Nov. 26, 2019

(54) SLOT LINER FORMING APPARATUS AND SYSTEM

(71) Applicant: GM GLOBAL TECHNOLOGY OPERATIONS LLC, Detroit, MI (US)

(72) Inventors: Frederick W. Rhoads, Holly, MI (US); John D. Campbell, Rochester Hills, MI (US); Rodney C. Malone, Clarkston, MI (US); Douglas M. Linn, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 321 days.

(21) Appl. No.: 15/486,713

(22) Filed: Apr. 13, 2017

(65) Prior Publication Data

US 2018/0301963 A1 Oct. 18, 2018

(51) Int. Cl.
*H02K 15/02* (2006.01)
*H02K 3/34* (2006.01)

(52) U.S. Cl.
CPC ........... *H02K 15/024* (2013.01); *H02K 3/345* (2013.01)

(58) Field of Classification Search
CPC ........... H02K 15/0018; H02K 15/0031; H02K 15/06; H02K 15/062; H02K 3/345; H02K 15/024
See application file for complete search history.

(56) References Cited

U.S. PATENT DOCUMENTS

| 3,722,063 | A | * | 3/1973 | Arnold | H02K 15/068 29/734 |
|---|---|---|---|---|---|
| 4,003,116 | A | * | 1/1977 | Bale | H02K 15/0018 29/734 |
| 4,051,595 | A | * | 10/1977 | Bale | H02K 15/0018 29/596 |
| 4,176,444 | A | * | 12/1979 | Walker | H02K 3/487 29/596 |
| 4,282,450 | A | * | 8/1981 | Eckels | H02K 3/24 310/215 |
| 4,432,400 | A | * | 2/1984 | Walker | H02K 15/068 140/92.1 |
| 4,455,743 | A | * | 6/1984 | Witwer | H02K 15/0037 29/564.1 |
| 8,907,541 | B2 | | 12/2014 | Carpenter | |

* cited by examiner

*Primary Examiner* — Carl J Arbes

(57) ABSTRACT

A slot flaring apparatus is presented herein. The slot flaring apparatus includes a base and flaring tool. The base is configured to receive and secure a stator that has a plurality of core slots. The flaring tool is configured to be controllably pressed against the stator and has a plurality of flaring teeth. Moreover, each tooth of the plurality of flaring teeth is configured to insert into and form a respective slot liner which has been inserted into the corresponding core slot.

8 Claims, 5 Drawing Sheets

SLOT LINER FORMING APPARATUS AND SYSTEM

INTRODUCTION

Die cut magnet wire tips are often sharp and have burrs. Process and product variation moreover creates differing levels of retention for each individual slot liner. By flaring the ends of the formed liner, assistance can be provided while the wire tip is centered and effectively inserted into the slot liner, reducing the risk of cuts to the liner walls as well as reducing risk of the slot liner getting crushed or accidentally being ejected from the core. In additional, by standardizing the size and depth of such flaring, operational slot liner movement is reduced and will absorb any variation in the material (e.g., width, thickness, etc.).

SUMMARY

A slot flaring apparatus is presented herein. The slot flaring apparatus includes a base and flaring tool. The base is configured to receive and secure a stator that has a plurality of core slots. The flaring tool is configured to be controllably pressed against the stator and has a plurality of flaring teeth. Moreover, each tooth of the plurality of flaring teeth is configured to insert into and form a respective slot liner which has been inserted into the corresponding core slot.

The slot flaring apparatus may include a press connected to, and in support of, the flaring tool. The press is configured to controllably press the flaring tool against the stator and may be a mechanical hand press, pneumatic press, hydraulic press, or a servo press. The slot flaring apparatus may further include a heating element on the flaring tool and is configured to conductively heat the plurality of flaring teeth. The slot flaring apparatus may further yet include a movable shelf configured to support the base and is further configured to move the base away from and closer to the flaring tool. The flaring tool may have a circular cross section. Each tooth of the plurality of flaring teeth may include a tapered shape and chamfer.

A method of forming a slot liner inserted into the core slot of a stator is further presented herein. The method includes the steps of: securing a stator onto a base, the stator having a plurality of core slots; positioning the base such that the stator can operatively receive a flaring tool, with the flaring tool having a plurality of flaring teeth; controllably pressing the flaring tool against the stator; allowing each tooth of the plurality of flaring teeth to insert into and form a respective slot liner in the corresponding core slot.

A slot flaring system is further yet presented herein. The system includes a stator, base, flaring tool, press, and one or more heating elements. The stator has a plurality of core slots, in addition a dielectric slot liner has been inserted into at least one core slot. The base is configured to receive and secure the stator. The flaring tool is configured to be controllably pressed against one side of the stator and includes a plurality of flaring teeth. The press is supportably connected to the flaring tool and is configured to controllably press the flaring tool against the stator. The heating elements are located on the backside of the flaring tool and are configured to conductively heat the plurality of flaring teeth. Moreover, each tooth of the plurality of flaring teeth is configured to insert into and functionally form the crown end of the respective slot liner in the corresponding core slot, which may additionally occur on both sides of the stator.

Moreover, the conductive heat provided to the plurality of flaring teeth facilitates the functional crown end formation of the slot liner.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The goal of the slot flaring apparatus presented herein is to provide a fast and consistent way to form (i.e., flare) a slot liner crown end so as to prevent liner push out and damage during the manufacturing process, wire assembly, and operation of an electro-dynamic machine's stator. This forming moreover enhances the ease of assembly while reducing risk of wire insertion damage for both manual and automatic insertion methods. In addition, the slot flaring apparatus can be used with various types of liners such as, but not limited to, multiple lumen slot liners and single phase in slot liners.

Figure 1:
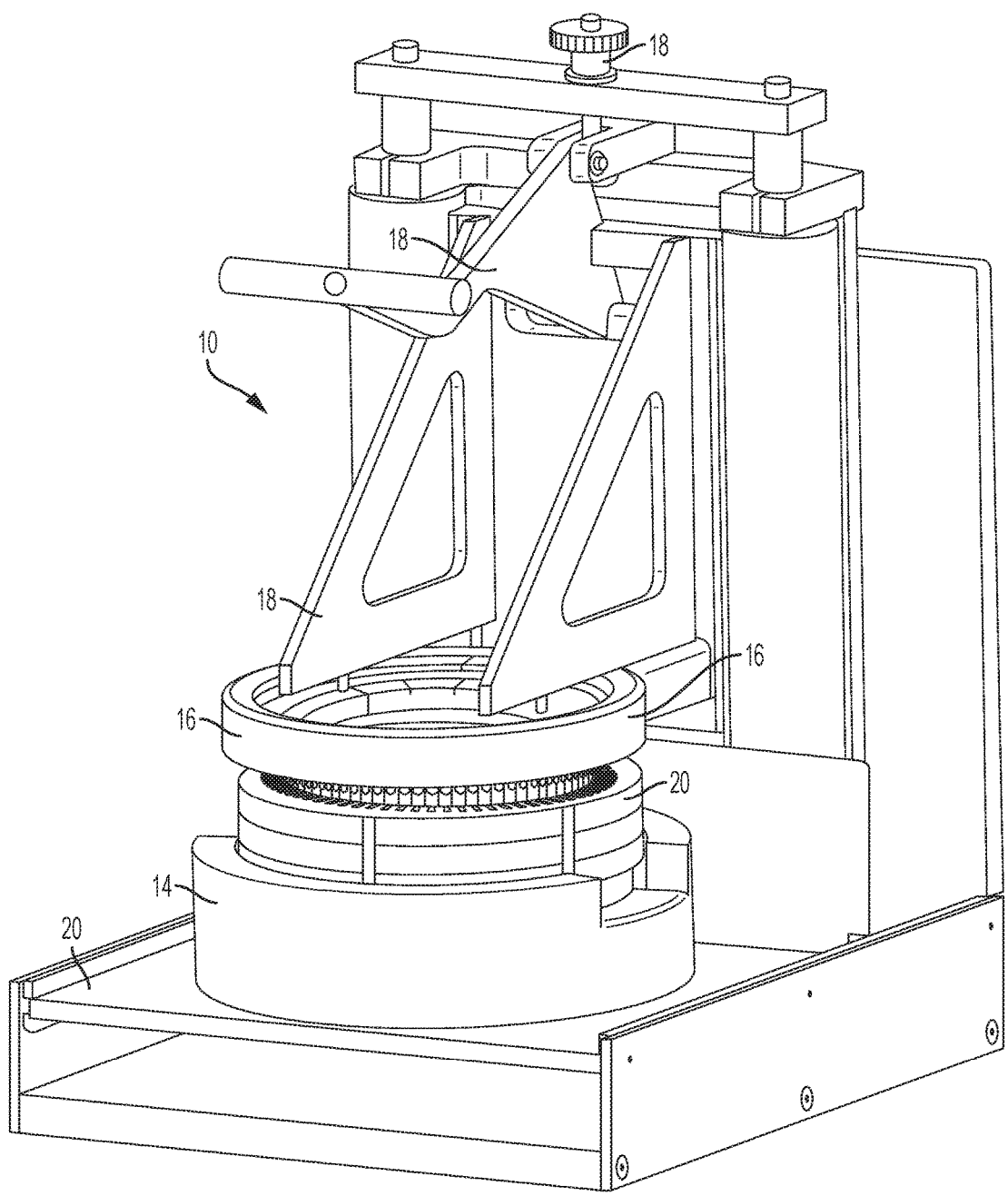
FIG. 1 shows a perspective view of an embodiment of a slot flaring apparatus.

As shown in FIG. 1, the slot flaring apparatus 10 enables simultaneous and consistent formation of every slot liner inserted into a magnetic steel stator 12. Slot flaring apparatus 10 moreover facilitates a consistent formation at a consistent height, and may include one or more heating elements (FIGS. 3 and 4) to assist in the stabilization of such formation. Apparatus 10 includes a removable base 14 to form a foundation for the stator 12 for secure placement onto apparatus 10. A flaring tool 16, now adjustably stationed above stator 12, moves up and down in a controlled manner via a mechanical hand press 18 and can press against the top side of stator 12. In addition, during operation of apparatus 10, teeth (discussed below) on the underside of flaring tool 16 can be controllably pressed into orifices on the top side of stator 12. As shown, moreover, base 14 rests on a slidable shelf 20 which can move away from press 18 on the horizontal axis so as to allow an operator to place stator 12 into base 14 without potentially damaging flaring tool 16 or press 18. However, it should be understood that base 14 can rest on platforms other than a slidable shelf without deviating from the fundamental aspects of apparatus 10. It should be further understood that press 18 may also be embodied as other types of presses such as, but not limited to, a hydraulic press, pneumatic press, or servo type press.

Figure 2:
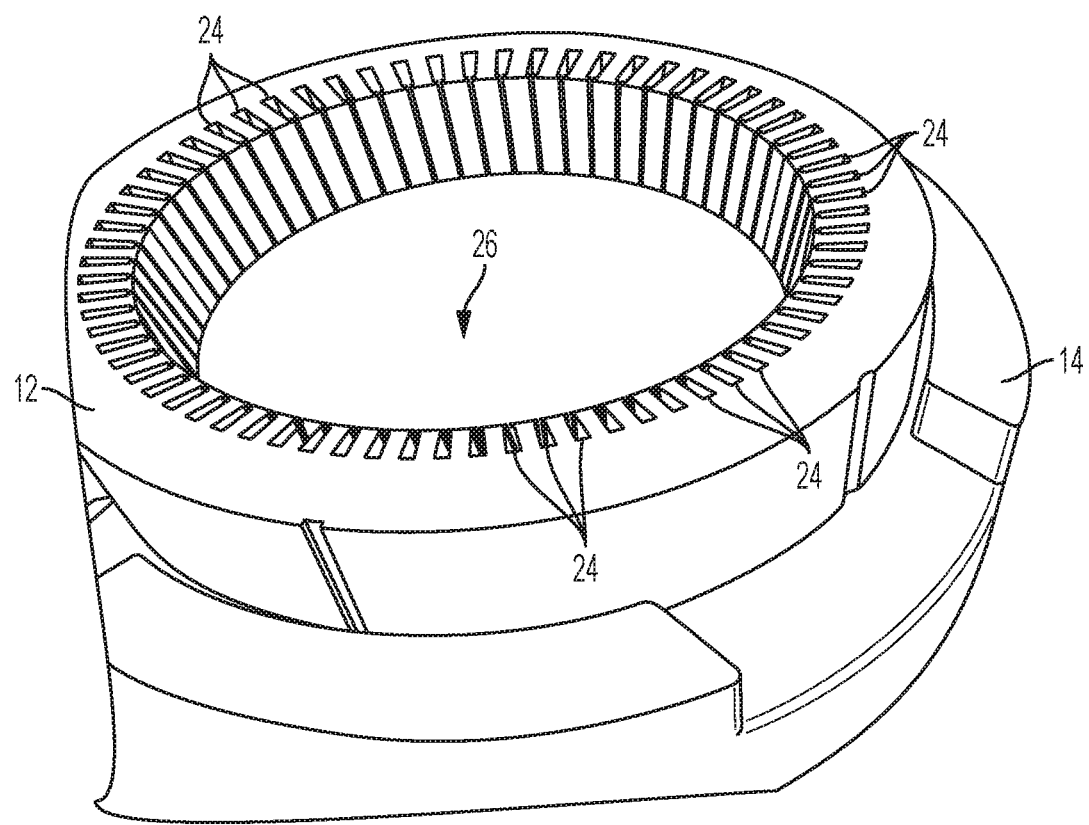
FIG. 2 shows a perspective view of an embodiment of a stator which may be implemented as a work piece of one or more embodiments of the slot flaring apparatus.

As shown in FIG. 2, stator 12 generally includes a circular cross section formed with numerous core slots 24 (orifices) around an aperture 26 in which a rotor (not shown) can be rotatably disposable. Conductive elements (e.g., wires) are supportively held in the core slots 24 and are receptive of current to drive rotation of the rotor. Moreover, although the conductive elements may have insulation provided about an electrically conductive material, additional slot liners 32 (FIGS. 5A and 5B) are insertably provided in each of the core slots 24.

Figure 3:
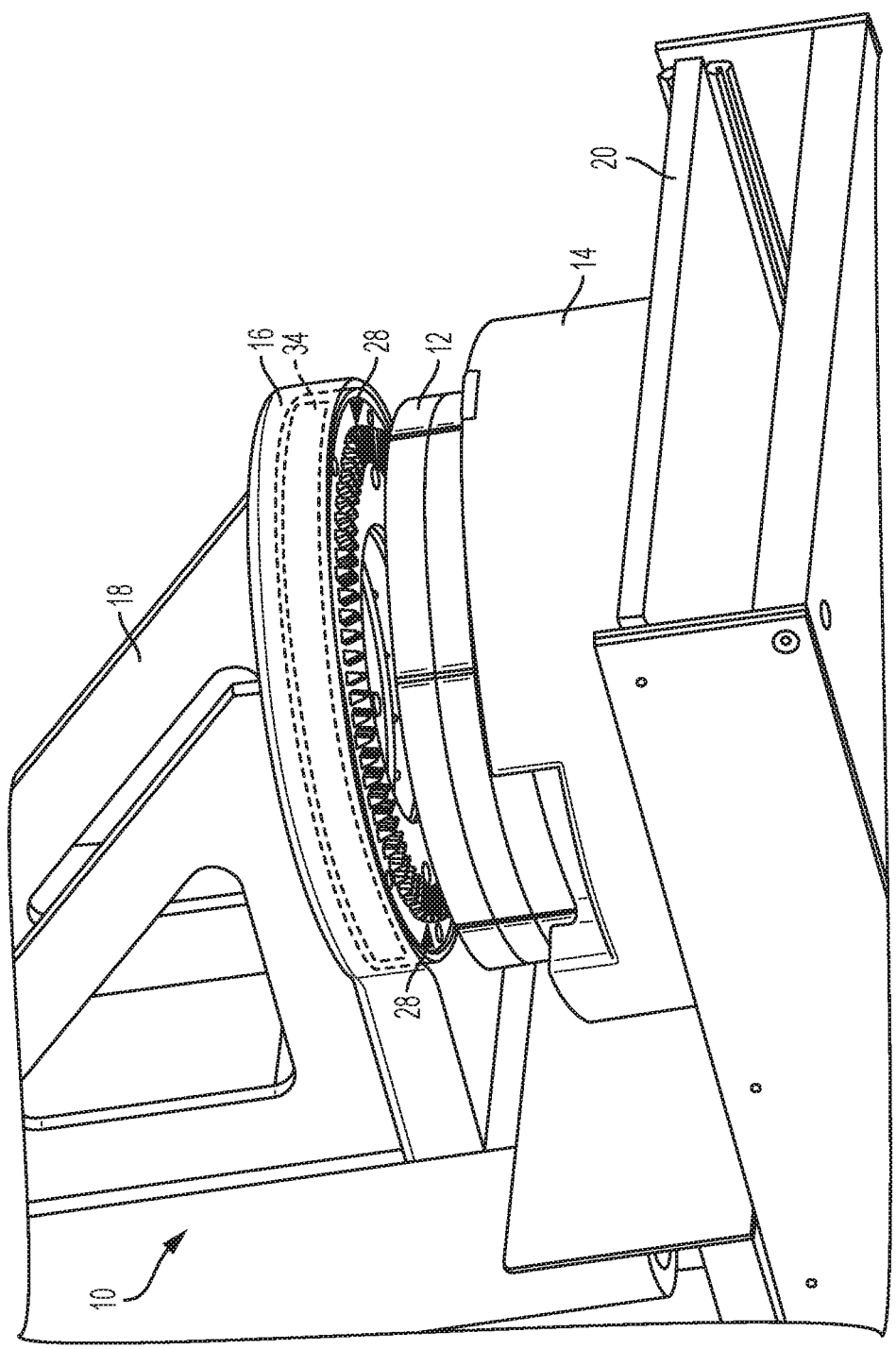
FIG. 3 shows a perspective view of an aspect of the slot flaring apparatus of FIG. 1.
Figure 4:
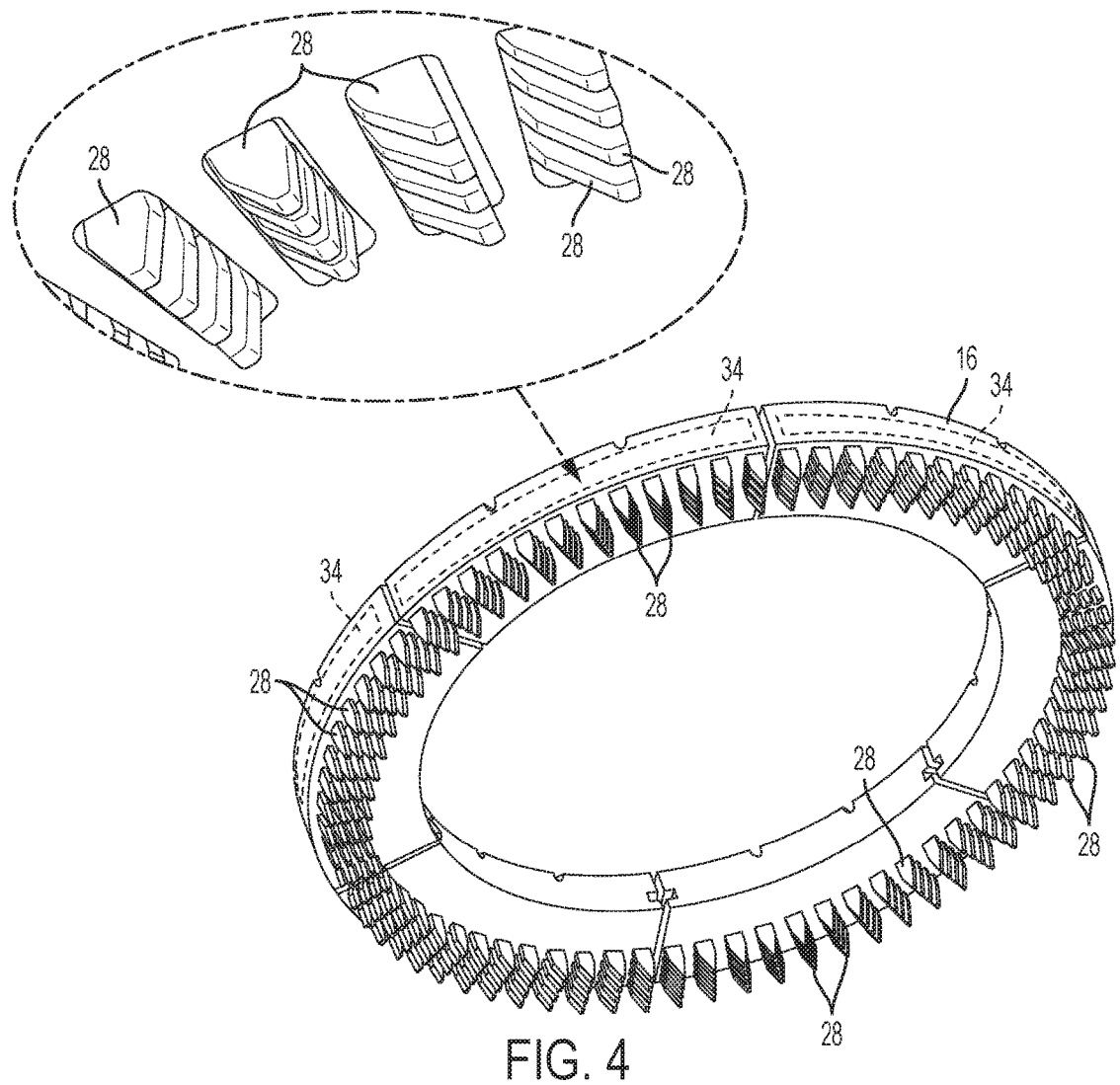
FIG. 4 shows a perspective view of an embodiment of a flaring tool which may be incorporated into one or more embodiments of the slot flaring apparatus.
Figure 5A:
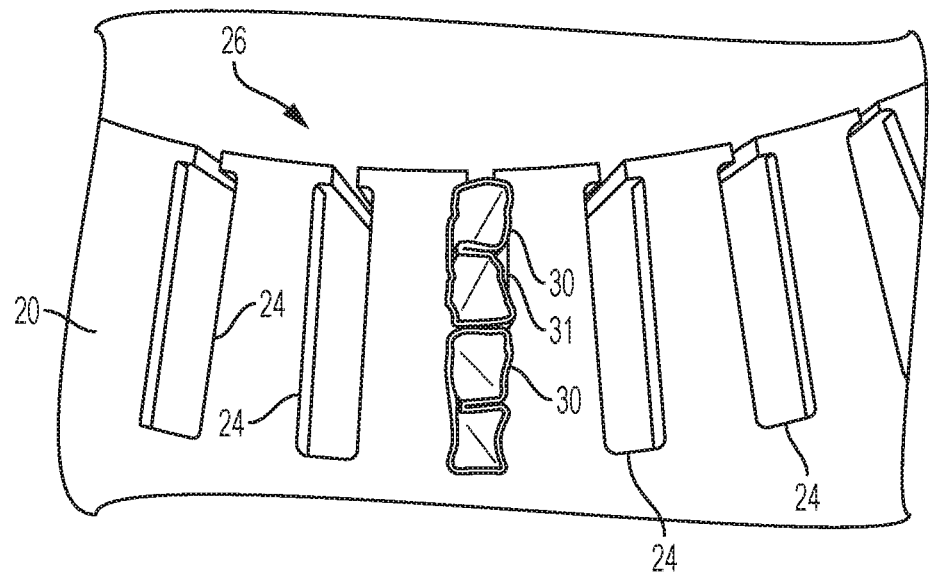
FIG. 5A shows a top view of an embodiment of a preformation slot liner inserted into the stator of FIG. 2.
Figure 5B:
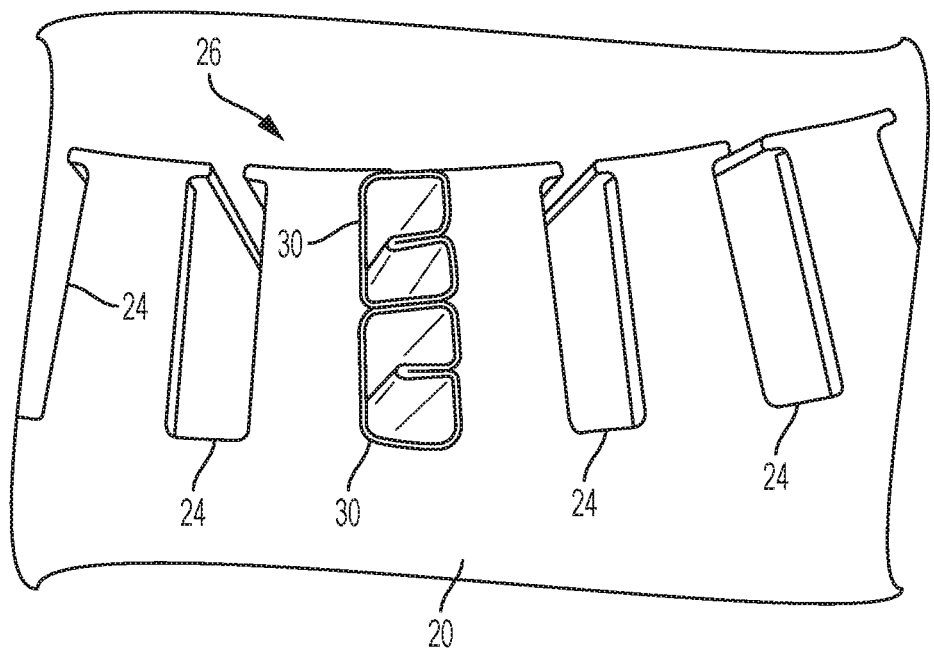
FIG. 5B shows a top view of an embodiment of a post-formation slot liner of FIG. 5A.

As shown in FIGS. 3 and 4, the flaring tool 16 has a circular cross section which corresponds to that of the cross section of stator 12. The underside of flaring tool 16 is entirely covered by series of chamfered flaring teeth 30 each of which have a tapered shape. Each of the flaring teeth 30 is moreover substantially identical. During operation, each of the flaring teeth 30 can be pressably inserted into a respective slot liner 32 such that their tapered shape helps to expand and form the crown end of the liner (FIGS. 5A and 5B). Heating elements 34 embodied herein as embedded heating coils may be installed into the backside of the flaring tool 16 to heat the flaring teeth 30. As such, the flaring teeth 30 can mold the dielectric material which makes up the corresponding slot liner 32 (e.g., Nomex, Mylar, etc.).

As shown in FIGS. 5A and 5B, each slot liner 32 is inserted into a corresponding core slot 24 in an axial direction such that its sidewalls attempt to line the surface of core slot 24. Each slot liner 32 should moreover vertically extend at least 2.5 millimeters from its respective core slot 24. The slot liner 32 thus provides a barrier between the conductive material (not shown) and the metallic lamination of stator 12. It should be understood that the slot liners 32 may either be manually loaded or integrated through a generally known automatic loading system.

Once the slot liner 32 is properly set into a corresponding core slot 24, an operator will push down on the press to cause flaring teeth 30 to press into their respective slot liner 32 and form the extending segment at its crown end (FIG. 5B). The heating elements may also be operated to conductively heat the flaring teeth 30 and thus shape the dialectic material at the crown end of each slot liner 32, to resemble that of the respective forming tooth 30. As can be seen, through apparatus 10, the collapsed crown end of the slot liner 30 may thus be prepared into a shape which adequately presses against the walls of the corresponding core slot 24 and adds friction to hold the slot liner 30 in the correct place. This shaping also removes any gaps 31 which can facilitate tearing/collapsing of the slot liner 30 during conductive material insertion. It should be understood that slot liner 30 forming can be done on either or both sides of stator 12 and may be done simultaneously to prevent movement during the forming procedure.

An exemplary method 100 to form a slot liner 30 is herein discussed below. One or more aspects of this method may be executed through an embodiment of the slot flaring apparatus 10 discussed above. In a first step, an operator may place stator 12 onto base 14 when shelf 20 is in a position which is not beneath the press 18 and flaring tool 16. In a second step, the operator is to operate press 18 to press flaring tool 16 to move onto stator 12. In this step, flaring teeth 30 should be aligned to press into their corresponding core slot 24 as well as slot liner 30. In an optional step, the operator may activate the heating elements 34 to heat the flaring teeth 30 while pressed into their respective slot liner 30. The heating elements 34 may otherwise be in operation before the flaring teeth 30 are inserted into their respective slot liner 30. After a moment or two has passed (e.g., one to two seconds), in a third step, the operator will operate the press 18 to move the flaring tool 16 away from stator 12. In a fourth step, after another moment has passed, the operator should slide shelf 20 way from being beneath press 18 and flaring tool 16 and remove stator 12 from apparatus 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A slot flaring apparatus comprising:
    a base configured to receivably secure a stator having a plurality of core slots;
    a flaring tool configured to be controllably pressed against the stator, the flaring tool comprising a plurality of flaring teeth, a heating element on the flaring tool, the heating element configured to conductively heat the plurality of flaring teeth; and
    wherein each tooth of the plurality of flaring teeth is configured to insert into and form a respective slot liner inserted into the corresponding core slot.

2. The slot flaring apparatus of claim 1, further comprising a press supportably connected to the flaring tool, the press configured to controllably press the flaring tool against the stator.

3. The slot flaring apparatus of claim 1, further comprising a movable shelf configured to support the base, the movable shelf further configured to move the base away from and closer to the flaring tool.

4. The slot flaring apparatus of claim 1, wherein the flaring tool has a circular cross section.

5. The slot flaring apparatus of claim 1, wherein the each tooth of the plurality of flaring teeth comprises a tapered shape and chamfer.

6. A slot flaring system comprising:
- a stator having a plurality of core slots, wherein a dielectric slot liner has been inserted into at least one core slot;
- a base configured to receivably secure the stator;
- a flaring tool configured to be controllably pressed against one side of the stator, the flaring tool comprising a plurality of flaring teeth;
- a press supportably connected to the flaring tool, the press configured to controllably press the flaring tool against the stator;
- one or more heating elements located on the backside of the flaring tool, the heating elements configured to conductively heat the plurality of flaring teeth; and
- wherein each tooth of the plurality of flaring teeth is configured to insert into and functionally form the crown end of the respective slot liner in the corresponding core slot, wherein the conductive heat provided to the plurality of flaring teeth facilitates the functional crown end formation of the slot liner.

7. The slot flaring system of claim 6, further comprising a slidable shelf configured to support the base, the slidable shelf further configured to move the base away from and closer to the flaring tool.

8. The slot flaring system of claim 6, wherein the flaring tool has a circular cross section.

* * * * *